United States Patent [19]
Gifford

[11] 3,833,171
[45] *Sept. 3, 1974

[54] TEMPERATURE RESPONSIVE VALVE ASSEMBLY

[75] Inventor: Robert T. Gifford, Yellow Springs, Ohio

[73] Assignee: Vernay Laboratories, Inc., Yellow Springs, Ohio

[ * ] Notice: The portion of the term of this patent subsequent to Oct. 10, 1989, has been disclaimed.

[22] Filed: July 18, 1973

[21] Appl. No.: 380,293

[52] U.S. Cl. .............................. 236/102, 236/93 R
[51] Int. Cl. ......................................... G05d 23/275
[58] Field of Search........... 236/102, 93 R, 93 A, 87

[56] References Cited
UNITED STATES PATENTS

| | | | |
|---|---|---|---|
| 2,210,446 | 8/1940 | Cerny | 236/102 |
| 2,966,170 | 12/1960 | Raulins | 236/93 X |
| 3,014,664 | 12/1961 | Meyer et al. | 236/81 |
| 3,322,345 | 5/1967 | Getz | 236/93 |
| 3,696,997 | 10/1972 | Gifford | 236/102 |

*Primary Examiner*—William E. Wayner
*Attorney, Agent, or Firm*—Biebel, French & Bugg

[57] ABSTRACT

A fluid flow metering valve which functions to decrease the effective area of a flow port in response to temperature decreases until a preselected temperature is reached, at which point further decreases in temperature have no appreciable effect on the effective size of the flow port area. The valve includes a valve casing constructed of a material having a relatively high coefficient of linear thermal expansion and a valve core slidably received in the casing and constructed of a material having a relatively low coefficient of linear thermal expansion. The valve core is provided with an enlarged head at one end and a shoulder adjacent its opposite end, both of which are adapted to engage abutments or stops formed in the bore in the casing receiving the core, and a coil spring urges these portions of the core and casing into engagement with each other.

10 Claims, 4 Drawing Figures

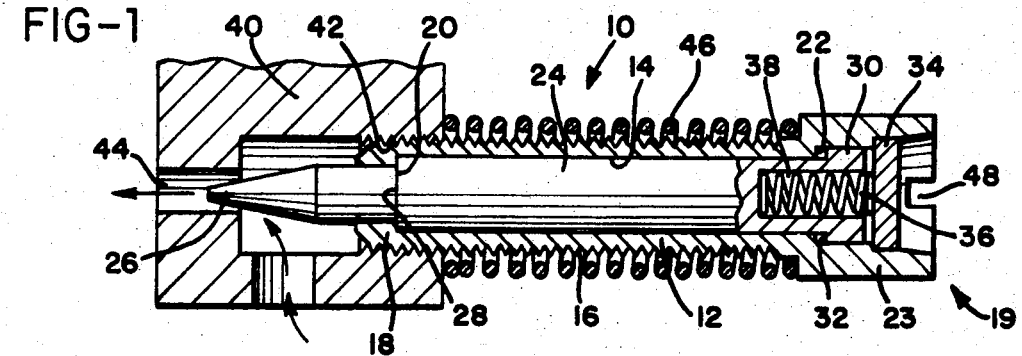
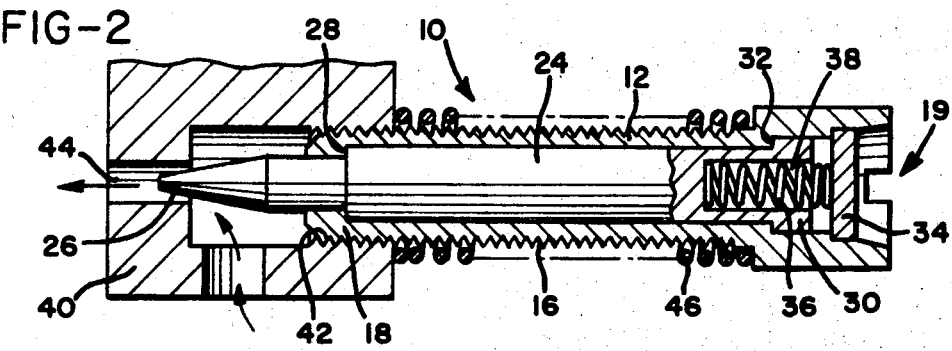
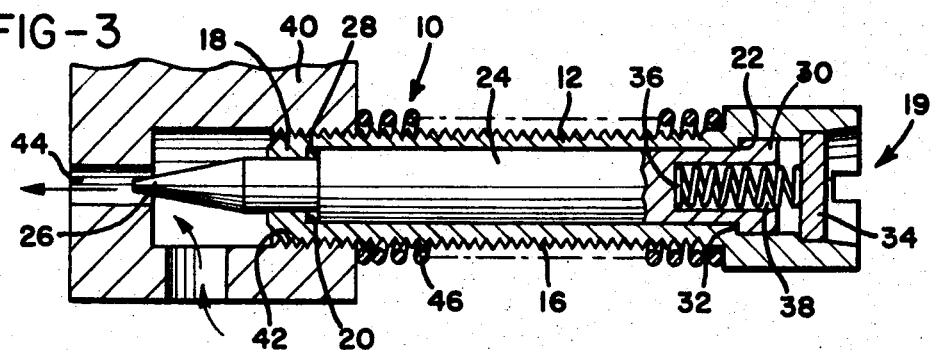
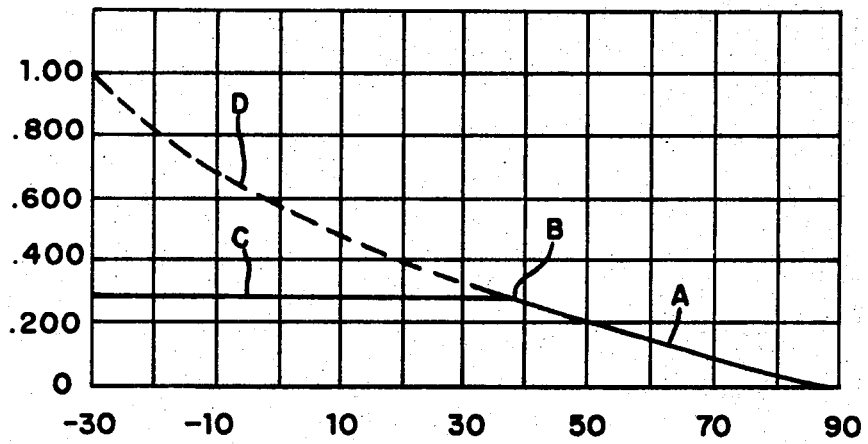

TEMPERATURE RESPONSIVE VALVE ASSEMBLY

CROSS REFERENCE TO RELATED APPLICATION

VALVE RESPONSIVE TO TEMPERATURE CHANGES OVER A LIMITED RANGE, by Robert T. Gifford, Ser. No. 132,666, filed Apr. 9, 1971, now U.S. Pat. No. 3,696,997, issued Oct. 10, 1972.

BACKGROUND OF THE INVENTION

The above noted U.S. Pat. No. 3,696,997 discloses a fluid flow metering valve consisting of a valve casing and a valve core, in which the valve core, having a conically shaped end positioned in a fluid flow port, may be constructed of a material having a relatively high coefficient of linear thermal expansion, while the valve casing may be constructed of a material having a relatively low coefficient of linear thermal expansion.

Therefore, as temperature increases are experienced by the valve assembly, the valve core expands, causing its conically shaped end to move farther into the fluid flow port to decrease the effective flow area thereof. In other words, increases in temperature result in decreases in the effective flow area of the flow port.

The valve assembly disclosed in this patent also provides for limiting the extent to which the effective area of the flow port is decreased, so that after a predetermined temperature is reached, further restriction of the effective flow area of the port is negligible.

While the valve described above functions effectively in the manner described above, there are instances when it is desirable to decrease effective flow port area in response to decreases in ambient temperature, but yet still maintain a substantially constant flow port area after a certain temperature is reached despite continued temperature decreases.

SUMMARY OF THE INVENTION

The present invention provides a valve assembly which is responsive to temperature decreases to decrease the effective flow area of a flow port with which the valve assembly is associated until a certain preselected temperature is reached, after which, further decreases in temperature result in only negligible change in the effective flow area of the port.

In accordance with the present invention, the valve assembly includes a valve casing formed of a material having a relatively high coefficient of linear thermal expansion and a valve core slidably received within an axially extending bore within the valve casing with the valve core formed of a material having a relatively low coefficient of linear thermal expansion.

The valve core is provided with a conically shaped end which is received within the flow port with which the valve assembly is associated, an enlarged shoulder adjacent its conically shaped end and an enlarged head at its opposite end. The bore through the valve casing is provided with complementary abutments or stops adapted to engage the shoulder and the enlarged head of the valve core and a coil spring is received within the valve casing and urges the shoulder and head of the valve core in a direction to engage the corresponding abutments or stops in the valve casing.

With the above construction, and with the valve assembly installed in the wall of a carburetor or the like and the conically shaped end of the core received within, for example, the idling flow port of the carburetor at some temperature above a preselected temperature, as the temperature decreases from the installation temperature the casing will contract, moving the conically shaped end of the valve core further into the flow port.

This assumes that at the installation temperature the shoulder of the valve core is spaced from its complementary abutment or stop. Therefore, as the valve casing contracts while the valve core remains relatively dimensionally stable, the coil spring in the opposite end of the valve casing urges the conically shaped end of the valve core into the flow port of the carburetor or the like with which the valve assembly is associated, thereby decreasing the effective flow area of the flow port.

This movement of the valve core in response to contraction of the valve casing will continue until the shoulder on the valve core engages its complementary abutment or stop in the valve casing, thereby limiting, for all practical purposes, any further decrease in effective flow port area.

Although the valve casing will continue to contract with continued decreases in temperature, this contraction is accommodated at the opposite end of the valve casing by the coil spring installed at this point. As the casing continues to contract the enlarged head of the valve core, which had been resting on the abutment or stop in the valve casing, will separate from the abutment or stop, this relative movement, as noted above, being accommodated by compression of the coil spring.

Of course, if a temperature increase is thereafter experienced the reverse reaction will occur, with the initial temperature increase being relatively ineffective to vary effective flow port area until such time as the enlarged head of the valve core once again engages the abutment at that end of the valve casing and thereafter, further temperature increases being effective to increase the effective flow area of the port by causing withdrawal of the conically shaped end of the valve core from the fluid flow port.

BRIEF DESCRIPTION OF THE DRAWINGS

FIG. 1 is a view, partly in cross section, showing a valve assembly associated with a fluid flow port, the effective area of which it is intended to regulate;

FIG. 2 is a view similar to FIG. 1, but showing the valve casing in a somewhat expanded condition;

FIG. 3 is a view similar to FIGS. 1 and 2, but showing the valve casing expanded even further; and FIG. 4 is a graphic depiction of the operation of the valve of the present invention.

DESCRIPTION OF THE PREFERRED EMBODIMENT

With reference initially to FIG. 1 of the drawings, it will be seen that a valve assembly 10 in accordance with the present invention includes a valve casing 12 formed of a material having a relatively high coefficient of linear thermal expansion and having an internal bore 14 and an externally threaded portion 16 extending from adjacent one end 18 thereof to an enlarged opposite end 19. At the end 18 of the casing an abutment defining shoulder 20 projects radially inwardly into the bore, while at its opposite end 19 a shoulder or stop member 22 is defined by a portion 23 projecting outwardly of the bore 14.

Received within the casing 12 is an elongated, unitary, rod-like valve member or core 24 formed of a material having a relatively low coefficient of linear thermal expansion and having a conically shaped, fluid flow regulating end 26. The valve core 24 is also provided with an outwardly projecting shoulder 28 positioned in opposition to the inwardly projecting abutment 20 of the valve casing. The opposite end of the valve core 24 is provided with an enlarged head portion 30 to provide an outwardly projecting shoulder 32 positioned in opposition to the shoulder 22 of the casing 10.

A retainer 34 is force fitted into the enlarged open end 20 of the casing 12 and serves to retain a spring member 36 mounted in a pocket 38 in the end of the valve member or core 24. Alternatively, any convenient means may be utilized to retain spring 36 within the casing 12. The valve assembly thus described may be readily fixed within a threaded opening of a member 40, such as the wall of a carburetor, by means of the external threads 16 thereof engaging complementary threads 42 formed in the wall of the member 40.

Thus, the casing 12 is threaded into the portion 42 of the member 40 to obtain the desired clearance between the conically shaped end 26 of the valve core 24 and a flow port 44, such as carburetor idle flow port, at a preselected temperature. A coil spring 46 encircles the outwardly projecting portion of the casing 12 and bears against the member 40 at one end and the enlarged head 23 of the casing at its opposite end and serves to retain the casing in this preset position. It will also be noted that the enlarged head 23 of the casing 12 may be provided with a tool engaging portion, such as the slot 48, to facilitate adjustment of the casing within the threaded portion of the member 40.

In operation, assume that the temperature is well above some preselected temperature below which it is desired to maintain the effective area of the flow port 44 substantially constant. At this point, the position of the valve components will be as seen in FIG. 3 of the drawings, with the valve casing 12 in an expanded condition so that the shoulder 28 of the valve core is spaced from the abutment 20 of the valve casing and the under surface of the enlarged head 30 of the core is pressed into engagement with the shoulder or stop member 22 of the valve casing by means of the coil spring 46.

Fluid flow through the member 40 may be in the direction shown by the arrows in FIGS. 1 through 3 of the drawings, although it will be apparent that the flow may be in the opposite direction. In either case, should the temperature thereafter decrease, the valve casing 12, having an appreciably higher coefficient of linear thermal expansion than that of the core, will begin to contract a much greater amount than the valve core, moving the conically shaped end 26 of the valve core farther into the flow port 44, thereby decreasing its effective flow area.

Continued decreases in temperature will result in continued contraction of the valve casing 12 until the shoulder 28 on the valve core 24 contacts the shoulder 20 on the casing 12. At this point the components of the valve assembly will assume the configuration shown in FIG. 2 of the drawings.

As the temperature experienced by the valve assembly continues to decrease, the valve casing 12 will continue to contract. However, since the shoulders 20 and 28 on the casing and core, respectively, are in abutment, further contraction of the casing 12 is accommodated by the spring 26, which will compress, allowing the under surface of the enlarged head portion 30 of the core 24 to become unseated from the shoulder or stop member 22 on the valve casing, as seen in FIG. 1 of the drawings.

Thus, after the valve casing has contracted to the condition shown in FIG. 2 of the drawings, further decreases in temperature and further contraction of the valve casing will have no appreciable effect on the effective flow area of the port 44, although there may be a negligible increase in flow area due to a minor contraction of the outwardly projecting end 26 of the valve core. However, since the valve core is constructed of a material having a relatively low coefficient of linear thermal expansion and since only a relatively minor portion of the core is affected, any variation due to dimensional changes of the valve core will be negligible.

The above described action of the valve assembly is depicted graphically in FIG. 4 of the drawings, wherein the abscissa represents the temperature experienced by the valve assembly in degrees Centrigrade, increasing from left to right as seen in FIG. 4, and the ordinate represents travel of the valve core end 26, indicated in millimeters of movement.

Thus, it will be seen that with the valve assembly experiencing a temperature of 90°C. and the components thereof in the position shown in FIG. 3 of the drawings, if the temperature thereafter decreases the end 26 of the valve core will move into the port 44, decreasing its effective flow area. This movement of the valve core end is represented by the curve A.

Movement of the valve core in response to decreases in temperature will continue until the point B on the curve A is reached, which corresponds to the condition shown in FIG. 2 of the drawings. Thereafter, the curve will continue substantially horizontally as indicated at C, even though the temperature being experienced by the valve assembly is decreasing and the valve casing 12 is contracting to the condition shown in FIG. 1 of the drawings.

While portion C of the curve is relatively flat, actually sloping downwardly very slightly to the left to reflect travel of the valve core end caused by the minor contraction thereof as temperature decreases, if the shoulder 28 and stop 20 were not provided, travel of the valve core end would be approximately as indicated by the dotted line portion D of the curve of FIG. 4.

Of course, it is necessary to dimension the length of the core 24 with respect to the length of the bore of the casing 12 as well as properly to select materials for the core and the casing having coefficients of linear thermal expansion to give the desired results. In this regard it has been found that the valve core may be formed of a material such as steel having a coefficient of linear thermal expansion of approximately $10 \times 10^{-6}$ cms/cm/°C., although 20 – 40 percent glass filled, relatively rigid, organic polymer, such as nylon, will also function satisfactorily.

The material of which the casing is formed must have an appreciably higher coefficient of linear thermal expansion and desirably is at least three times greater than the thermal coefficient of expansion of the valve core. In constructing the valve casing various relatively rigid, organic polymers, such as nylon, polyethylene, acetal resins, polyesters, acrylics and polyvinyldiene fluoride, have been found satisfactory. Thus, using steel as the core material and forming the casing of polyvinyldiene fluoride, the coefficient of linear thermal expansion of the casing or shell will be approximately thirteen times greater than that of the core.

Obviously, however, a wide variety of materials may be utilized in practicing the present invention and with various combinations of readily available materials the range of differences in coefficients of linear thermal expansion will range from about three to 25. The only requirements are that the coefficients of linear thermal expansion of the core and the casing are sufficiently different to provide enough casing dimensional change to give appreciable core travel, and that the length of the core relative to the length of the internal bore of the casing is such as to permit appreciable travel of the core only within certain predetermined limits.

While the forms of apparatus herein described constitute preferred embodiments of the invention, it is to be understood that the invention is not limited to these precise forms of apparatus, and that changes may be made therein without departing from the scope of the invention.

What is claimed is:

1. A thermally responsive valve comprising:
   a. a valve casing having a relatively high coefficient of linear thermal expansion,
   b. means defining a bore extending longitudinally of said casing,
   c. a valve core having a relatively low coefficient of linear thermal expansion compared to said casing slidably received in said bore,
   d. abutment means positioned in said bore adjacent one end thereof,
   e. abutment engaging means on said valve core positioned in opposition to said abutment means for engagement therewith upon expansion of said core,
   f. stop means positioned adjacent an opposite end of said bore,
   g. stop engaging means on said valve core positioned in opposition to said stop means, and
   h. means for urging said stop engaging means into engagement with said stop means.

2. The valve of claim 1 wherein:
   a. said stop means comprises an enlarged portion of said bore defining an outwardly projecting shoulder.

3. The valve of claim 2 wherein:
   a. said means for urging said stop engaging means into contact with said stop means comprises a spring member mounted in said enlarged portion of said bore and pushing said stop engaging means toward said stop means.

4. The valve of claim 3 further comprising:
   a. a retainer extending inwardly of said enlarged portion of said bore in spaced relation to said stop means and in engagement with said spring member, and
   b. means defining a pocket formed in said core and receiving said spring member.

5. The valve of claim 1 wherein:
   a. said stop engaging means comprises an outwardly projecting head formed on one end of said core in overlying relationship to said stop means.

6. The valve of claim 5 wherein:
   a. said means urging said head into engagement with said stop means comprises a spring member, and
   b. a retainer is mounted in said bore in engagement with said spring member and in spaced relationship to said stop means to retain said spring in contact with said core.

7. The valve of claim 6 further comprising:
   a. means defining a pocket in said one end of said core receiving said spring member.

8. A thermally responsive valve comprising:
   a. a valve casing having a longitudinally extending bore,
   b. means defining an abutment adjacent one end of said bore and a stop adjacent an opposite end of said bore,
   c. a valve core slidably received in said bore and having portions adapted to engage said abutment and stop defining means,
   d. the length and coefficient of linear thermal expansion of said core with respect to the length of said bore and the coefficient of linear thermal expansion of said casing being such that:
      i. said abutment and stop engaging means engage said abutment and stop, respectively, at a first temperature,
      ii. said abutment engaging means is spaced from said abutment and said stop engaging means engages said stop at a second temperature higher than said first temperature, and
      iii. said abutment engaging means engages said abutment and said stop engaging means is spaced from said stop at a third temperature lower than said first temperature.

9. The valve of claim 8 further comprising:
   a. means defining a flow port, and
   b. means fixing said valve casing with respect to said flow port with a portion of said valve core positioned in said port,
   c. said valve core being operative to vary the effective open area of said flow port over a first temperature range and relatively inoperative to vary said effective open area over a second temperature range.

10. The valve of claim 8 further comprising:
    a. a portion of said bore adjacent one end thereof being of reduced cross section, forming an inwardly projecting shoulder defining said abutment,
    b. a second portion of said bore adjacent an opposite end thereof being of enlarged cross section, forming an outwardly projecting shoulder defining said stop,
    c. a portion of said core adjacent said one end of said bore defining an outwardly projecting shoulder disposed in opposition to and for engagement with said inwardly projecting shoulder of said bore upon expansion of said core,
    d. a portion of said core adjacent said opposite end of said bore being of enlarged cross section and defining a head positioned for engagement with said outwardly projecting shoulder of said bore upon contraction of said core, and
    e. spring means resiliently urging said head into engagement with said outwardly projecting shoulder.

* * * * *